United States Patent
Lipka et al.

(10) Patent No.: US 10,202,966 B2
(45) Date of Patent: Feb. 12, 2019

(54) WIND TURBINE ROTOR BLADE HAVING A SPARK GAP

(71) Applicant: Nordex Energy GmbH, Hamburg (DE)

(72) Inventors: Thomas Lipka, Rostock (DE); Jochen Kremer, Hamburg (DE)

(73) Assignee: Nordex Energy GmbH, Hamburg (DE)

(*) Notice: Subject to any disclaimer, the term of this patent is extended or adjusted under 35 U.S.C. 154(b) by 395 days.

(21) Appl. No.: 15/226,493

(22) Filed: Aug. 2, 2016

(65) Prior Publication Data

US 2017/0045037 A1 Feb. 16, 2017

(30) Foreign Application Priority Data

Aug. 10, 2015 (EP) .................................. 15180399

(51) Int. Cl.
*F03D 80/30* (2016.01)
*F03D 80/40* (2016.01)
*F03D 1/06* (2006.01)

(52) U.S. Cl.
CPC ............ *F03D 80/30* (2016.05); *F03D 1/0675* (2013.01); *F03D 80/40* (2016.05); *Y02E 10/721* (2013.01)

(58) Field of Classification Search
CPC ........ F03D 1/0675; F03D 80/30; F03D 80/40; Y02E 10/721
See application file for complete search history.

(56) References Cited

U.S. PATENT DOCUMENTS

| | | | |
|---|---|---|---|
| 6,612,810 B1 | 9/2003 | Olsen et al. | |
| 8,888,454 B2 * | 11/2014 | Hansen | F03D 1/0675 415/4.3 |
| 8,939,726 B2 * | 1/2015 | Grabau | F03D 1/0675 415/4.3 |
| 2008/0145229 A1 * | 6/2008 | Llorente Gonzalez | F03D 1/065 416/230 |
| 2010/0047070 A1 * | 2/2010 | Slot | F03D 1/065 416/146 R |
| 2010/0119370 A1 * | 5/2010 | Myhr | F03D 7/02 416/39 |
| 2012/0141277 A1 * | 6/2012 | Yarbrough | F03D 80/30 416/146 R |
| 2013/0100570 A1 * | 4/2013 | Lyngby | H02H 7/24 361/117 |
| 2013/0181457 A1 * | 7/2013 | Lyngby | H01T 4/08 290/55 |
| 2013/0280073 A1 * | 10/2013 | Erichsen | F03D 1/0675 416/146 R |
| 2014/0348654 A1 | 11/2014 | Klein | |
| 2015/0204311 A1 | 7/2015 | Clemens | |
| 2017/0045036 A1 * | 2/2017 | Ohlerich | F03D 80/40 |

FOREIGN PATENT DOCUMENTS

DE    10 2005 045 579 A1    3/2007

* cited by examiner

*Primary Examiner* — Igor Kershteyn
(74) *Attorney, Agent, or Firm* — Walter Ottesen, P.A.

(57) ABSTRACT

A wind turbine rotor blade is provided. The wind turbine blade has a lightning receptor, a first electric line, and a potential equalization arrangement having a first electrode, which is connected to the lightning receptor, and a second electrode, which is connected to the first electric line, a spark gap being formed between the two electrodes, mutually facing sides of the two electrodes forming an air flow channel, which is arranged such that the ambient air that is incident when the wind turbine rotor blade is in operation flows through it.

14 Claims, 5 Drawing Sheets

WIND TURBINE ROTOR BLADE HAVING A SPARK GAP

CROSS REFERENCE TO RELATED APPLICATION

This application claims priority of European patent application No. 15180399.6, filed Aug. 10, 2015, the entire content of which is incorporated herein by reference.

FIELD OF THE INVENTION

The invention relates to a wind turbine rotor blade having a lightning receptor, a first electric line, and a potential equalization arrangement having a first electrode, which is connected to the lightning receptor, and a second electrode, which is connected to the first electric line, a spark gap being formed between the two electrodes.

BACKGROUND OF THE INVENTION

It is known to use lightning protection to protect wind turbine rotor blades against damage by a lightning strike. For this purpose, a lightning receptor is usually disposed in the region of the blade tip. The current of lightning striking into the lightning receptor is then diverted, via a lightning conductor, toward the blade root, and from there, via the nacelle and the tower of the wind turbine, into the ground. If a plurality of electrically conductive elements are arranged, more or less in parallel, in the wind turbine rotor blade, electromagnetic induction in the case of a lightning strike causes large potential differences between the electrically conductive elements that can result in flashovers, or even in the destruction of the wind turbine rotor blade. It is known to counteract such flashovers by potential equalization elements.

Such a potential equalization is necessary, in particular, if one of the electrically conductive elements is an electric heating device for de-icing the surface of the wind turbine rotor blade. These heating devices are provided with an electric power supply, and when in operation must be electrically isolated from the lightning protection system. For this purpose, spark gaps may be provided inside the rotor blade, between the heating device and the lightning protection arrangement, as shown in U.S. Pat. No. 6,612,810. In the event of a lightning strike, these spark gaps are bridged, and establish a potential equalization between the heating device and the lightning protection arrangement.

United States patent application publication 2015/0204311 shows a wind turbine rotor blade having an electric heating device and a lightning conductor. The heating device and the lightning conductor are connected to each other, at a plurality of locations over the length of the rotor blade, via spark gaps. The spark gaps are disposed inside the rotor blade, in combination with the lightning receptors.

In order to ensure the operational reliability of the lightning protection arrangement, the functional performance of the spark gaps must be checked regularly. In this case, in particular, spark gaps arranged in the blade tip region are accessible only with difficulty.

SUMMARY OF THE INVENTION

It is an object of the invention to provide a wind turbine rotor blade, having a potential equalization arrangement which can more easily be kept in an operationally reliable state.

The object is achieved by providing a wind turbine rotor blade including: a potential equalization arrangement having a first electrode and a second electrode; a lightning receptor connected to the first electrode; an electric line connected to the second electrode; a spark gap formed between the first and second electrodes; the first and second electrodes having mutually facing sides; the mutually facing sides forming an air flow channel; and, the air flow channel being arranged so as to cause oncoming ambient air to flow through the flow channel as the wind turbine rotor blade is in operation.

The wind turbine rotor blade has a lightning receptor, a first electric line, and a potential equalization arrangement having a first electrode, which is connected to the lightning receptor, and a second electrode, which is connected to the first electric line, a spark gap being arranged between the two electrodes, and mutually facing sides of the two electrodes forming a flow channel, which is arranged such that the ambient air that is incident when the wind turbine rotor blade is in operation flows through it.

The lightning receptor may be arranged, in particular, at or close to a blade tip of the wind turbine rotor blade, but also at a greater distance therefrom, also in combination with one or more further lightning receptors. It is usually composed of metal, for example of copper or aluminum, and provides an exposed surface, on the exterior of the wind turbine rotor blade, into which lightning can strike.

The first electric line may be a lightning conductor or other electric line, for example a supply line, by which electrical energy can be supplied to an electric load disposed in or on the wind turbine rotor blade, or a signal line, via which the electrical signals can be transmitted, for example, from a sensor disposed in or on the wind turbine rotor blade. The first electric line may be dimensioned such that, in the event of a lightning strike in which potential equalization is effected by the spark gap, it can wholly or partially carry a lightning current, in particular as far as a blade root. In this sense, the first electric line may be a lightning conductor, even if the first electric line fulfills a different function when the wind turbine rotor blade is in normal operation. The first electric line is electrically isolated from the lightning receptor. It is only in the event of a lightning strike that potential equalization is effected by the spark gap.

The connection of the first electrode to the lightning receptor and/or the connection of the second electrode to the first electric line may be an indirect or direct connection. For example, this connection may include a rigid electric conductor, a more or less flexible cable and/or a screwed connection.

The two electrodes are preferably solid metal parts, in particular composed of copper. The two electrodes are arranged at a distance from each other, which is dimensioned such that, in the case of the high potential differences that occur in a lightning strike, a flashover occurs, the distance simultaneously ensuring a sufficient electrical isolation for the potential differences that occur when the wind turbine rotor blade is in normal operation. Typically, the distance between the two electrodes may be in the order of magnitude of approximately one or more centimeters. The two mutually facing sides of the electrodes may have surfaces aligned parallel to each other, but may also be disposed at an angle to each other.

In the case of the invention, the mutually facing sides of the two electrodes form an air flow channel, which is arranged such that the ambient air that is incident when the wind turbine rotor blade is in operation flows through it. The air flow channel between the two electrodes is a free space, through which the ambient air flows. It is laterally delimited, wholly or partially, by the two electrodes, and may be open on one or more further sides, or delimited by other elements, for example an exterior of the wind turbine rotor blade. If a flashover occurs between the two electrodes as a result of a lightning strike, an arc forms between the two mutually facing sides of the electrodes, the arc crossing the flow channel and being oriented substantially transversely in relation to a direction of flow in the flow channel.

The arrangement of an air flow channel between the two electrodes has two effects that ensure the lasting and faultless functional performance of the spark gap. On the one hand, the air flow through the air flow channel has a self-cleaning effect. Moisture or particles are removed, largely automatically, by the high air flow speeds. On the other hand, the airflow in the air flow channel prevents a spark, that has flashed over as a result of a lightning strike, from being maintained by a potential difference between the lightning receptor and the first electric line. This can happen if, in normal operation, the potential difference between the two electrodes is greater than the arc voltage. In this case, owing to the ionization of the air, the arc voltage is substantially less than the ignition voltage required for a flashover. The strong airflow cools the arc and guides it backward, in the direction of the flow channel, resulting in reliable extinction of the spark/arc.

In one embodiment, the flow channel is arranged on an exterior of the wind turbine rotor blade that is exposed to the incident ambient air. In particular, the flow channel may be open on its side that faces away from the exterior of the wind turbine rotor blade, such that it is directly accessible from outside. In principle, the flow channel may also be fully or partially integrated into the wind turbine rotor blade. However, an exterior disposition results in a particularly effective flow through the flow channel, and simplifies access for servicing and repair purposes.

In one embodiment, the flow channel is arranged on a pressure side of the wind turbine rotor blade. In principle, the air flow channel may also be arranged on the suction side. When the wind turbine rotor blade is in operation, however, particularly stable flow conditions form on the pressure side, since turbulences or flow separations scarcely occur. The air flow through the air flow channel is therefore particularly effective on the pressure side in differing operating conditions.

In one embodiment, the air flow channel has a longitudinal direction that is oriented in the direction of the incident ambient air. This measure likewise favors a uniform flow through the air flow channel.

In one embodiment, the air flow channel widens in the direction of the air flowing through it. In this case, the distance between the first electrode and the second electrode increases in the direction of the airflow flowing through the air flow channel. Following the ignition of an arc, this flow causes displacement of the arc. As the distance between the electrodes increases, the arc voltage increases, resulting in an extinction of the spark as soon as the arc voltage becomes greater than the potential difference between the two electrodes. As a result, the extinction of the spark is achieved in a yet more reliable manner.

In one embodiment, the first electrode and/or the second electrode have the basic shape of a disk. In particular, they may be composed of a metal plate of substantially uniform thickness. As a result, the electrodes can be fastened particularly easily, in particular to an exterior of the wind turbine rotor blade, the electrodes having a sufficient current carrying capacity and having relatively little effect on the air flow conditions on the rotor blade.

In one embodiment, the first electrode and/or the second electrode have an underside that bears against the exterior of the wind turbine rotor blade, and have one or more lateral faces disposed obliquely relative to the underside. As the distance from the underside increases, the dimensions of the electrodes can become smaller, owing to the obliquely disposed lateral faces. Obliquely disposed lateral faces are aerodynamically advantageous. The mutually facing sides of the two electrodes may also be disposed obliquely, such that the flow channel formed between them is substantially trapezoidal in cross section.

In one embodiment, the wind turbine rotor blade has an electric heating device, and the first electric line is a supply line, via which the electric heating device can be supplied with a heating current. In this case, the electrical isolation between the first electric line and the lightning receptor, which is usually connected to ground by a lightning conductor, enables current to be reliably conveyed to the heating device. At the same time, damage to the supply line or to the electric heating device, resulting from the potential equalization that occurs in the case of a lightning strike, is avoided.

In one embodiment, the wind turbine rotor blade has a lightning conductor, which is connected to the lightning receptor and leads to a blade root. The lightning conductor is a second electric line and, if necessary, like the first electric line, may also fulfill an additional function, for instance as a supply or signal line. For this purpose, the lightning conductor may be electrically isolated from the ground potential, if necessary, for example by a further spark gap or other voltage surge diverter.

In one embodiment, the lightning conductor is arranged on the suction side of the wind turbine rotor blade, and is connected to the first electrode via an electric connecting piece that is arranged inside the wind turbine rotor blade and that leads from the suction side to the first electrode. This enables a reliable electrical connection to be made between the lightning conductor and a first electrode that is arranged on the pressure side. The electric connecting piece may be mounted, in particular, during joining of a pressure-side and a suction-side rotor blade shell, in which case the lightning conductor can already be integrated beforehand into the suction-side half-shell.

In one embodiment, the lightning conductor is arranged on a suction side of the wind turbine rotor blade, and is connected to the first electrode via a busbar arranged on an exterior of the wind turbine rotor blade. By such a busbar, a reliable electrical connection can likewise be established between the lightning conductor on the suction side and a first electrode disposed on the pressure side, in particular following the joining of two rotor blade half-shells.

In one embodiment, the busbar is routed around a profile trailing edge of the wind turbine rotor blade. An unwanted interaction between the busbar and an electric heating device, arranged predominantly in the region of a profile leading edge, is thereby avoided.

In one embodiment, the first electrode has an end of the busbar that is arranged at a distance from the lightning conductor. The busbar and the first electrode are thus a single component. For example, the busbar may be made of a solid metal strip or band. There is no need for providing a separate, first electrode, or to effect a connection between the first electrode and the busbar.

In one embodiment, a surface region on the exterior of the wind turbine rotor blade, in which the two electrodes are arranged, is provided with a heat-resistant coating. In the case of ignition of the spark gap, the coating serves as a protective layer for the material of the rotor blade shell (for example, a glass fiber laminate), and may be composed, for example, of ceramic or Teflon.

BRIEF DESCRIPTION OF THE DRAWINGS

The invention will now be described with reference to the drawings wherein.

DESCRIPTION OF THE PREFERRED EMBODIMENTS OF THE INVENTION

All figures are schematic representations and use the same references for mutually corresponding elements.

Figure 1:
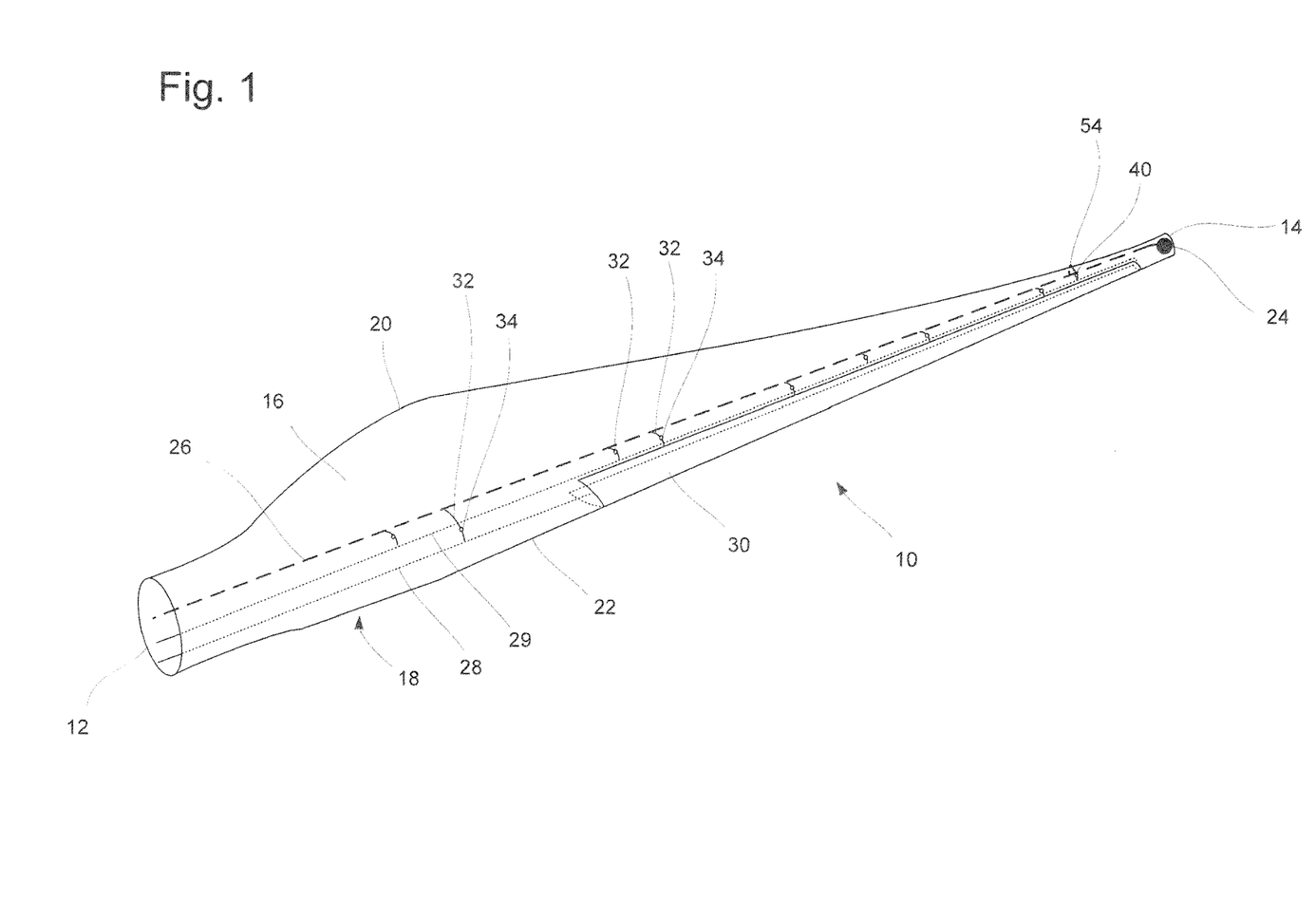
FIG. 1 is a simplified, perspective illustration of a rotor blade according to an embodiment of the invention.

FIG. 1 shows a wind turbine rotor blade 10 with an electric heating device 30. Wind turbine blades are generally known in the prior art. The wind turbine rotor blade 10 has a blade root 12 and a blade tip 14. In FIG. 1, the view is directed substantially toward the pressure side 16. On the side facing away from the viewer the wind turbine rotor blade 10 has a suction side 18.

The wind turbine rotor blade 10 has a profile trailing edge 20 and a profile leading edge 22. A lightning receptor 24 is disposed in the region of the blade tip 14, which is connected in an electrically conductive manner to a lightning conductor 26, which is indicated by a broken line. The current of a lightning strike into the lightning receptor 24 can be diverted in the direction of the blade root 12 via the lightning conductor 26. The wind turbine rotor blade 10 has an electric heating device 30, through which current flows in the longitudinal direction and which, at its end on the blade root side and at its end on the blade tip side, is in each case connected to an electric power supply cable 28, 29. Between the heating device 30 and the lightning conductor 26, and between the electric power supply cables 28, 29 and the lightning conductor 26, there are potential equalization connections 32, which each have an interposed spark gap 34. A potential equalization device according to an embodiment of the invention is disposed in the region of the rotor blade tip. The potential equalization device is located on the surface of the rotor blade and is realized as a busbar 54 having two electrodes, between which there is a spark gap 40. During normal operation, the electric heating device 30 and the lightning conductor 26 are electrically isolated from each other, in order to prevent the heating current from leaking away via the lightning conductor 26. In the event of a lightning strike, the spark gaps 34, 40 are ignited by the lightning current, which results in a potential equalization between the parallel conductors.

Figure 2A:
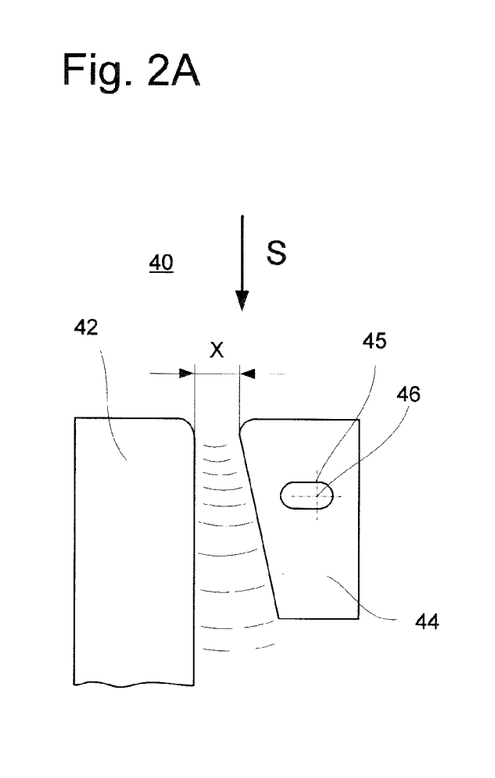
FIGS. 2A to 2C are detailed illustrations of spark gaps according to three embodiments of the invention.
Figure 2B:
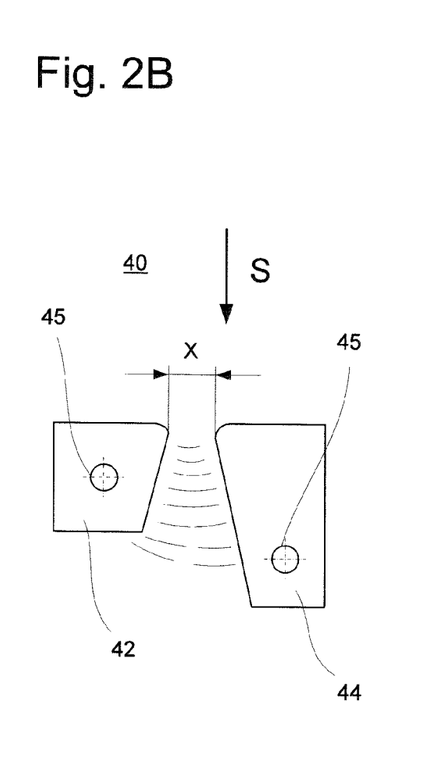
Figure 2C:
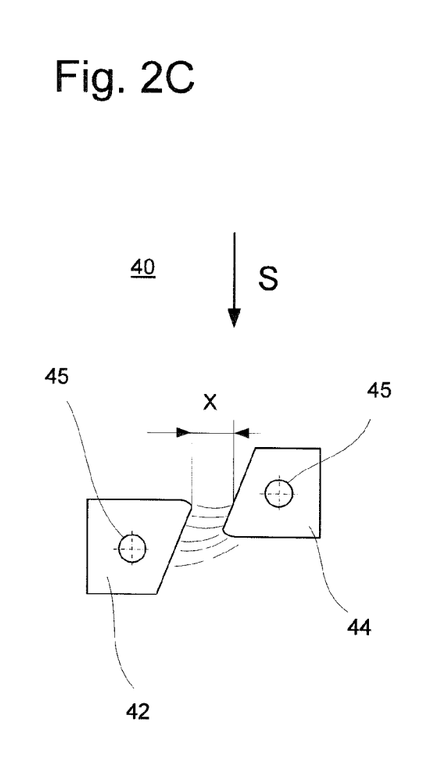

FIGS. 2A to 2C are detailed illustrations of three embodiments of outer spark gaps 40 according to the invention. In all three embodiments, the spark gaps 40 include a first electrode 44 and a second electrode 42. Each of the two electrodes 42, 44 is connected to a lightning conductor or to another electric conductor (not shown in FIGS. 2A to 2C) via a fastener 46. In the embodiment shown in FIG. 2A, the point of contact with the electric conductor is located at the other end of the busbar (not shown). The fastener 46 may be, for example, threaded bolts, which can be inserted in the drilled holes 45 in the electrodes 42, 44. In this way, the electrodes 42, 44 can also be fastened to a wind turbine rotor blade 10. In the embodiment shown in FIG. 2A, the drilled holes 45 may also be realized as an elongate hole, to enable the distance X between the electrodes 42, 44 to be set.

The electrodes 42, 44 are disposed on an outer side of the wind turbine rotor blade 10, on the surface, preferably on the pressure side, since the latter is less susceptible to aerodynamic disturbance. The distance X between the electrodes 42, 44 is dimensioned such that the spark gap ignites only upon the occurrence of high voltages, such as those that occur in the case of a lightning strike. In the case of low voltages, such as those used, for example, to supply the electric heating device, the spark gap does not ignite, and the two electrodes 42, 44 remain electrically isolated from each other. The electrodes 42, 44 may be positioned such that the gap between the electrodes is parallel to the direction of incident air flow S. In this way, the gap between the electrodes can be continually cleared of adhering particles, such as sand or dust.

An air flow channel, through which the incident air flows, is formed between the mutually facing sides of the electrodes 42, 44. The air flow channel is delimited on one side by the pressure-side surface of the wind turbine rotor blade 10. The mutually facing sides of the electrodes 42, 44 form lateral delimitations of the flow channel. On the side that faces away from the surface of the wind turbine rotor blade 10, the flow channel is open, and likewise at the front and rear, where the incident air can flow in and out. The air flow channel has a longitudinal direction that corresponds substantially to the direction of the incident air flow S.

Furthermore, the electrodes 42, 44 are of such a geometric configuration that the distance X between the opposing edges of the electrodes, and consequently the length of the spark gap, increases in the direction of incident air flow S. The flow channel formed by the electrodes 42, 44 widens accordingly in the direction of air flow. Following the ignition of the arc, the airflow perpendicular to the spark gap and the increasing distance X cause the arc to be displaced in the direction of incident air flow S. As the distance between the electrodes 42, 44 becomes greater, the arc voltage increases, resulting in extinction of the spark as soon as the arc voltage becomes greater than the applied power supply voltage (provided, for example, to operating the electric heating device). In addition, the air flow along the spark gap causes cooling of the arc, and this further increases the arc voltage.

In FIGS. 2A to 2C, the electrodes 42, 44 each have a shape of a disk or plate. In FIG. 2A, the second electrode 42 has an approximately rectangular shape, while the first electrode 44 is trapezoidal. Owing to the oblique edge of the first electrode 44 that faces toward the second electrode 42, the gap X between the electrodes 42, 44 widens in the direction of the air flow.

In FIG. 2B, both electrodes 42, 44 have a trapezoidal shape. The oblique sides of the trapezoid are mutually opposite, such that, again, a gap that widens in the direction of the incident air flow S is produced. Since both sides extend obliquely, the width of the gap increases more rapidly than in the embodiment of FIG. 2A.

FIG. 2C shows a third embodiment of a spark gap according to the invention. The trapezoidal electrodes 42, 44 are disposed in a double mirror-image (point-symmetrical) arrangement. An air flow channel, extending approximately in the direction of incident air flow S, is produced in an overlap region. The extent of the overlap can be used to selectively set the region in which the spark gap ignites.

Figure 3:
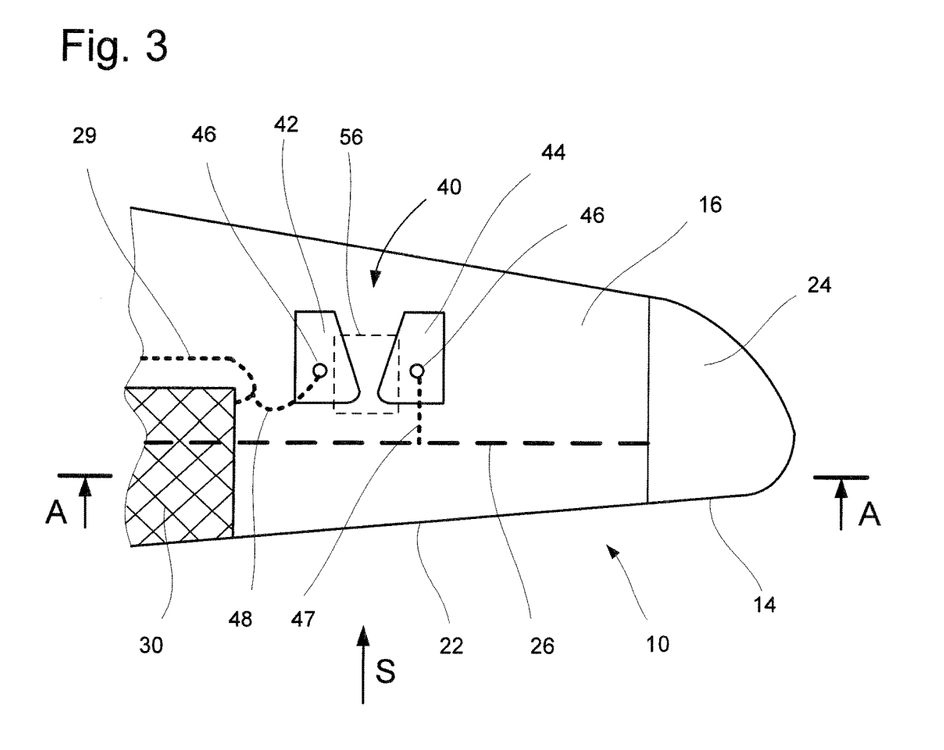
FIG. 3 shows the blade tip region on the pressure side of a first wind turbine rotor blade according to an embodiment of the invention.

FIG. 3 schematically shows the region near the blade tip of a wind turbine rotor blade 10 according to the invention, as viewed toward the pressure side 16. The wind turbine rotor blade 10 receives an incident air flow from the leading edge 22. The direction of the incident air flow S is indicated by arrow S.

The rotor blade is provided with an electric heating device 30, which is supplied with electric current via an electric power supply cable 29. The electric power supply cable 29 is an example of a first electric line, and is connected to an end of the electric heating device 30 that is on the blade tip side.

At the blade tip 14, the wind turbine rotor blade 10 has a lightning receptor 24, which is connected to a lightning conductor 26 that leads to the blade root 12. On the pressure side 16 of the wind turbine rotor blade 10 there is an outer spark gap 40, having a first electrode 44 and a second electrode 42. The mutually facing sides of the two electrodes 42, 44 are both disposed obliquely in relation to the direction of incident air flow S, such that the gap between the electrode 42, 44, or the width X of the flow channel formed by them, widens greatly in the direction of flow. A possible follow current in the spark gap 40, following a lightning strike, therefore extinguishes safely.

A surface region 56 of the wind turbine rotor blade 10 that is surrounded by a broken line in FIG. 3 is provided with a heat-resistant coating, in order to prevent damage to the underlying material of the wind turbine rotor blade 10 as a result of the action of heat. The two electrodes are disposed in the surface region 56.

A first connecting cable 47 is fastened, by a fastener 46, to the first electrode 44, and connects the latter to the lightning conductor 26. A second connecting cable 48 is fastened, by a fastener 46, to the second electrode 42, and connects the latter to the electric power supply cable 29 of the electric heating device 30. In normal heating operation, the electric heating device 30 is electrically isolated from the lightning conductor 26. In the event of a lightning strike, a spark gap is ignited between the first and the second electrode 44, 42, which results in a potential equalization between the lightning conductor 26 and the electric power supply cable 29.

Figure 4:
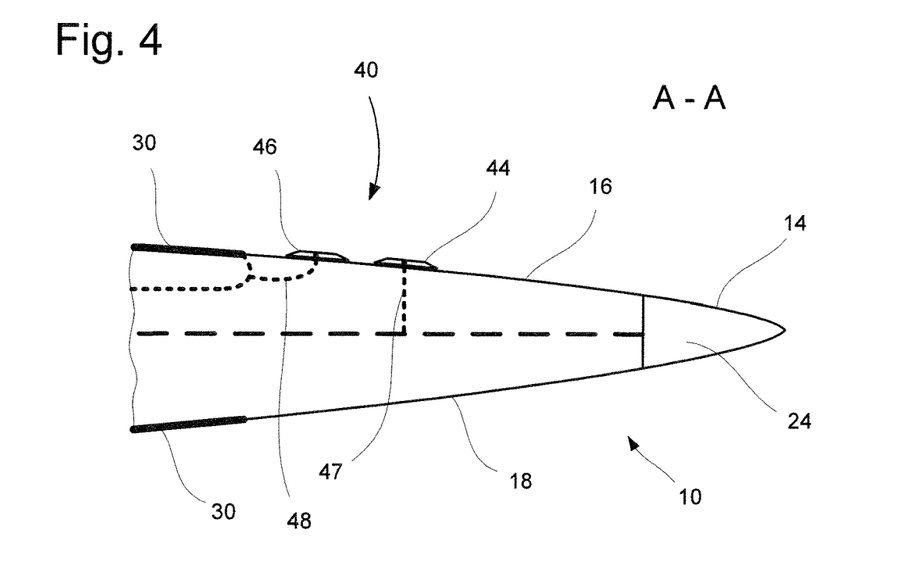
FIG. 4 is a section view of the blade tip region along the plane denoted by A-A in FIG. 3, as viewed from the profile leading edge.

FIG. 4 shows the blade tip region from FIG. 3 along the section A-A, as viewed from the profile leading edge 22. The direction of incident air flow S is into the viewing plane. The first connecting cable 47 is an electric connecting piece, which may also be realized as a fixed, conductive connecting base. This solution provides a simple way of contacting following the joining of two rotor blade shells in the production of the wind turbine rotor blade 10.

Figure 5:
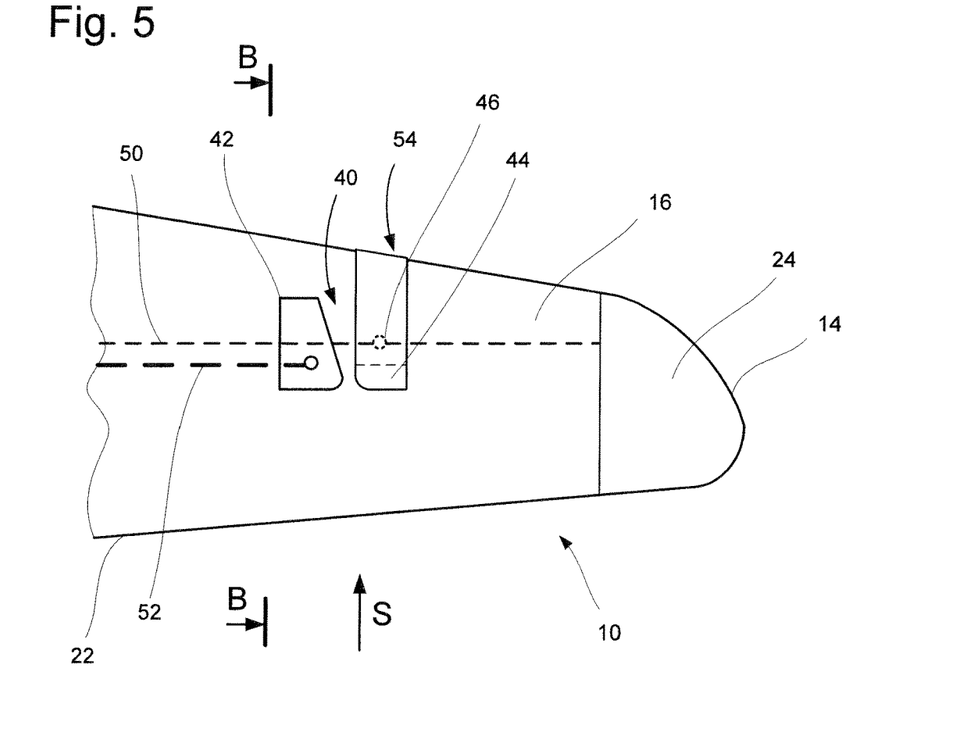
FIG. 5 shows the blade tip region on the pressure side of a second wind turbine rotor blade according to an embodiment of the invention.

FIG. 5, schematically shows the region near the blade tip of a wind turbine rotor blade 10 according to a further embodiment of the invention, as viewed toward the pressure side 16. It receives incident air flow from the profile leading edge 22. The direction of incident air flow S is indicated by arrow S. The wind turbine rotor blade 10 has two lightning conductors 50, 52, of which the first lightning conductor 50 extends on the suction side, and the second lightning conductor 52 extends on the pressure side 16. The first lightning conductor 50, on the suction side, extends from the lightning receptor 24 at the blade tip 14, via a contact point at the end of the busbar 54, on the suction side, as far as the blade root. It thus provides the connection between the first electrode 44 and the lightning receptor 24. The lightning conductor 52 on the pressure side is connected to the second electrode 42 on the pressure side.

Figure 6:
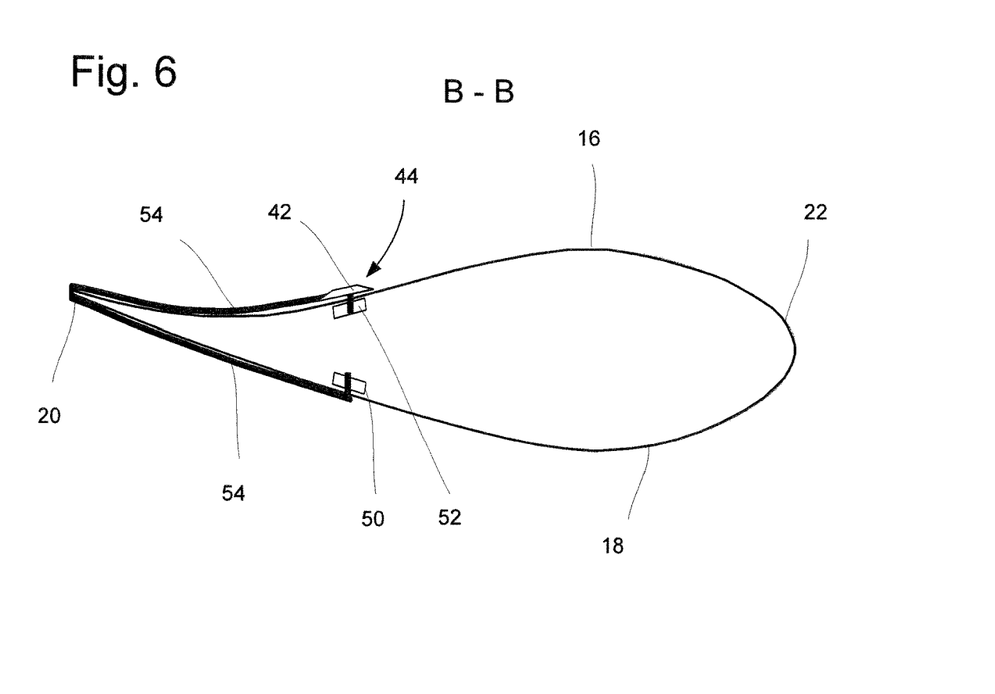
FIG. 6 is a section view of the blade tip region along the plane denoted by B-B in FIG. 5, as viewed from the blade tip.

FIG. 6 is a profile view of the wind turbine rotor blade 10 in the section plane B-B shown in FIG. 5. On the pressure side 16 of the wind turbine rotor blade 10, there is an outer spark gap 40, having a first electrode 44, which is disposed, being concealed, behind a second electrode 42. The first electrode 44 is part of a busbar 54 that extends around the profile trailing edge 20 of the wind turbine rotor blade 10 and, on the suction side 18, is connected to the first lightning conductor 50 by fastener 46. The second electrode 42 is connected, on the pressure side, to the second lightning conductor 52, which is an example of a first electric line.

Figure 7:
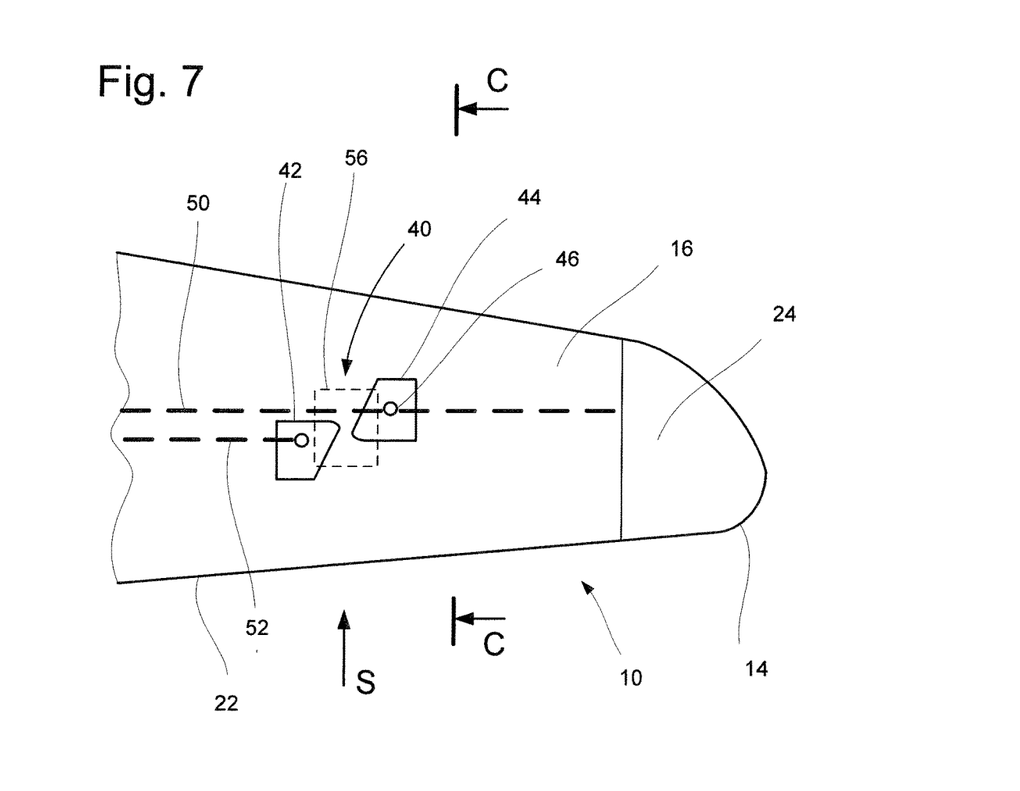
FIG. 7 shows the blade tip region on the pressure side of a third wind turbine rotor blade according to an embodiment of the invention; and, FIG. 8 is a section view of the blade tip region along the plane denoted by C-C in FIG. 7, as viewed from the blade tip.

FIG. 7 schematically shows the region near the blade tip of a third wind turbine rotor blade 10 according to the invention, as viewed toward the pressure side 16. The wind turbine rotor blade 10 receives the incident air flow from the profile leading edge 22. The direction of the incident air flow S is indicated by arrow S. The wind turbine rotor blade 10 has two lightning conductors 50, 52, both of which extend inside the wind turbine rotor blade 10, on the pressure side 16. The first lightning conductor 50 extends as far as the lightning receptor 24 at the blade tip 14, and thus connects the first electrode 44 to the lightning receptor 24. The lightning conductors 50, 52 are each connected to an electrode 42, 44 by fastener 46. The electrodes 42, 44 are disposed according to the embodiment shown in FIG. 2C.

In FIG. 7, also, a surface region 56 of the wind turbine rotor blade 10, in which the two electrodes are disposed, has a heat-resistant coating.

Figure 8:
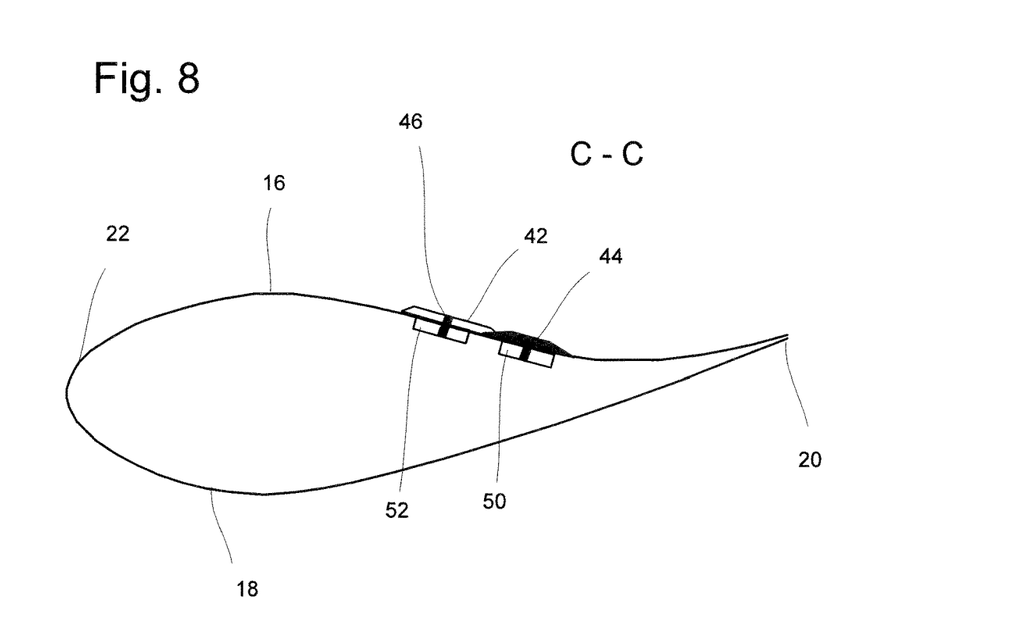

FIG. 8 shows a section through the wind turbine rotor blade 10 from FIG. 7, in the plane C-C. It can be seen that the first electrode 44 and the second electrode 42 overlap partially.

It is understood that the foregoing description is that of the preferred embodiments of the invention and that various changes and modifications may be made thereto without departing from the spirit and scope of the invention as defined in the appended claims.

LIST OF REFERENCE NUMERALS:

10 wind turbine rotor blade
12 blade root
14 blade tip
16 pressure side
18 suction side
20 profile trailing edge
22 profile leading edge
24 lightning receptor
26 lightning conductor
28 electric power supply cable
29 electric power supply cable 30 heating device
32 potential equalization connection
34 spark gap
40 outer spark gap
42 second electrode
44 first electrode
45 drilled hole
46 fastening means
47 first connecting cable
48 second connecting cable
50 first lightning conductor
52 second lightning conductor
54 busbar
56 surface region with coating
S direction of incident flow
X distance

What is claimed is:

1. A wind turbine rotor blade comprising:
a potential equalization arrangement having a first electrode and a second electrode;
a lightning receptor connected to said first electrode;
an electric line connected to said second electrode;
a spark gap formed between said first and second electrodes;
said first and second electrodes having mutually facing sides;
said mutually facing sides forming an air flow channel; and,
said air flow channel being arranged so as to cause oncoming ambient air to flow through said flow channel as the wind turbine rotor blade is in operation.

2. The wind turbine rotor blade of claim 1, further comprising:
an outer side exposed to said oncoming ambient air; and,
said air flow channel being arranged on said outer side.

3. The wind turbine rotor blade of claim 2, wherein:
at least one of said first and second electrodes has an underside that bears against said outer side; and,
at least one of said first and second electrodes has one or more lateral faces disposed obliquely relative to said underside.

4. The wind turbine rotor blade of claim 2, further comprising:
a lightning conductor connected to said lightning receptor;
a blade root; and,
said lightning conductor leading to said blade root.

5. The wind turbine rotor blade of claim 4, further comprising:
a suction side;
an electric connecting piece disposed inside the wind turbine rotor blade and leading from said suction side to said first electrode;
said lightning conductor being disposed on said suction side; and,
said electric connecting piece connecting said lightning conductor with said first electrode.

6. The wind turbine rotor blade of claim 5, further comprising:
a busbar arranged on said outer side;
said lightning conductor being arranged on said suction side; and,
said lightning conductor being connected to said first electrode via said busbar.

7. The wind turbine rotor blade of claim 6, further comprising:
a profile trailing edge; and, said busbar being routed around said profile trailing edge.

8. The wind turbine rotor blade of claim 6, wherein:
said busbar has an end arranged at a distance from said lightning conductor; and,
said end forms said first electrode.

9. The wind turbine rotor blade of claim 2, further comprising:
a surface region defining an area on said outer side in which said first and second electrodes are arranged; and,
said surface region being provided with a heat-resistant coating.

10. The wind turbine rotor blade of claim 1, further comprising:
a pressure side; and,
said air flow channel being arranged on said pressure side.

11. The wind turbine rotor blade of claim 1, wherein:
said oncoming ambient air defines a flow direction;
said air flow channel defines a longitudinal direction; and,
said longitudinal direction is aligned with said flow direction of said oncoming ambient air.

12. The wind turbine rotor blade of claim 11, wherein said air flow channel widens in said flow direction.

13. The wind turbine rotor blade of claim 1, wherein at least one of said first and second electrodes has a shape of a disk.

14. The wind turbine rotor blade of claim 1, further comprising:
an electric heating device; and,
said electric line being a supply line to supply said electric heating device with a heating current.

\* \* \* \* \*